US008667491B2

(12) United States Patent
Sijelmassi et al.

(10) Patent No.: US 8,667,491 B2
(45) Date of Patent: Mar. 4, 2014

(54) METHOD AND APPARATUS FOR EXECUTING A TRANSITION WORKFLOW BETWEEN SWIM LANES OF A WORKFLOW

(75) Inventors: Rachid Sijelmassi, Chevy Chase, MD (US); Anil Parthasarathy, Herndon, VA (US)

(73) Assignee: CA, Inc., Islandia, NY (US)

( * ) Notice: Subject to any disclaimer, the term of this patent is extended or adjusted under 35 U.S.C. 154(b) by 1215 days.

(21) Appl. No.: 12/274,920

(22) Filed: Nov. 20, 2008

(65) Prior Publication Data

US 2009/0187905 A1   Jul. 23, 2009

Related U.S. Application Data

(60) Provisional application No. 60/989,733, filed on Nov. 21, 2007.

(51) Int. Cl.
*G06F 9/46* (2006.01)

(52) U.S. Cl.
USPC ........................................... 718/100

(58) Field of Classification Search
None
See application file for complete search history.

(56) References Cited

U.S. PATENT DOCUMENTS

| 7,289,966 B2* | 10/2007 | Ouchi | 705/7.13 |
| 7,406,424 B2* | 7/2008 | Cheeniyil et al. | 705/301 |
| 7,496,860 B2* | 2/2009 | Saxena et al. | 715/853 |
| 8,001,429 B2* | 8/2011 | Breiter et al. | 714/48 |

* cited by examiner

*Primary Examiner* — Meng An
*Assistant Examiner* — Eric C Wai
(74) *Attorney, Agent, or Firm* — Myers Bigel Sibley & Sajovec, P.A.

(57) ABSTRACT

A method of executing a workflow in a computer includes representing a main workflow of at least one computer as a series of steps which are linked to define the workflow, the steps being grouped in at least two groups. The method includes representing a transition workflow as at least one transition step, the transition step not being linked to the steps of the main workflow and defining a rule for executing the transition workflow based on transitions between steps of different groups. The method includes executing in at least one computer the steps of the main workflow in an order defined by the links. The method includes evaluating the rule to determine whether the rule applies when, during the executing, a step from one of the groups is followed by a step from another of the groups and executing in at least one computer the steps of the transition workflow when the rule applies.

27 Claims, 3 Drawing Sheets

METHOD AND APPARATUS FOR EXECUTING A TRANSITION WORKFLOW BETWEEN SWIM LANES OF A WORKFLOW

CROSS-REFERENCE TO RELATED APPLICATION

This application is based on and derives the benefit of the filing date of U.S. Provisional Patent Application No. 60/989,733, filed Nov. 21, 2007. The entire content of this application is herein incorporated by reference in its entirety.

FIELD OF THE INVENTION

The present disclosure relates generally to workflow execution in a computer and, more particularly, to the use of semantic Swim Lanes to manage transitions in a workflow for the computer.

DETAILED DESCRIPTION OF SEVERAL EMBODIMENTS

Figure 1:
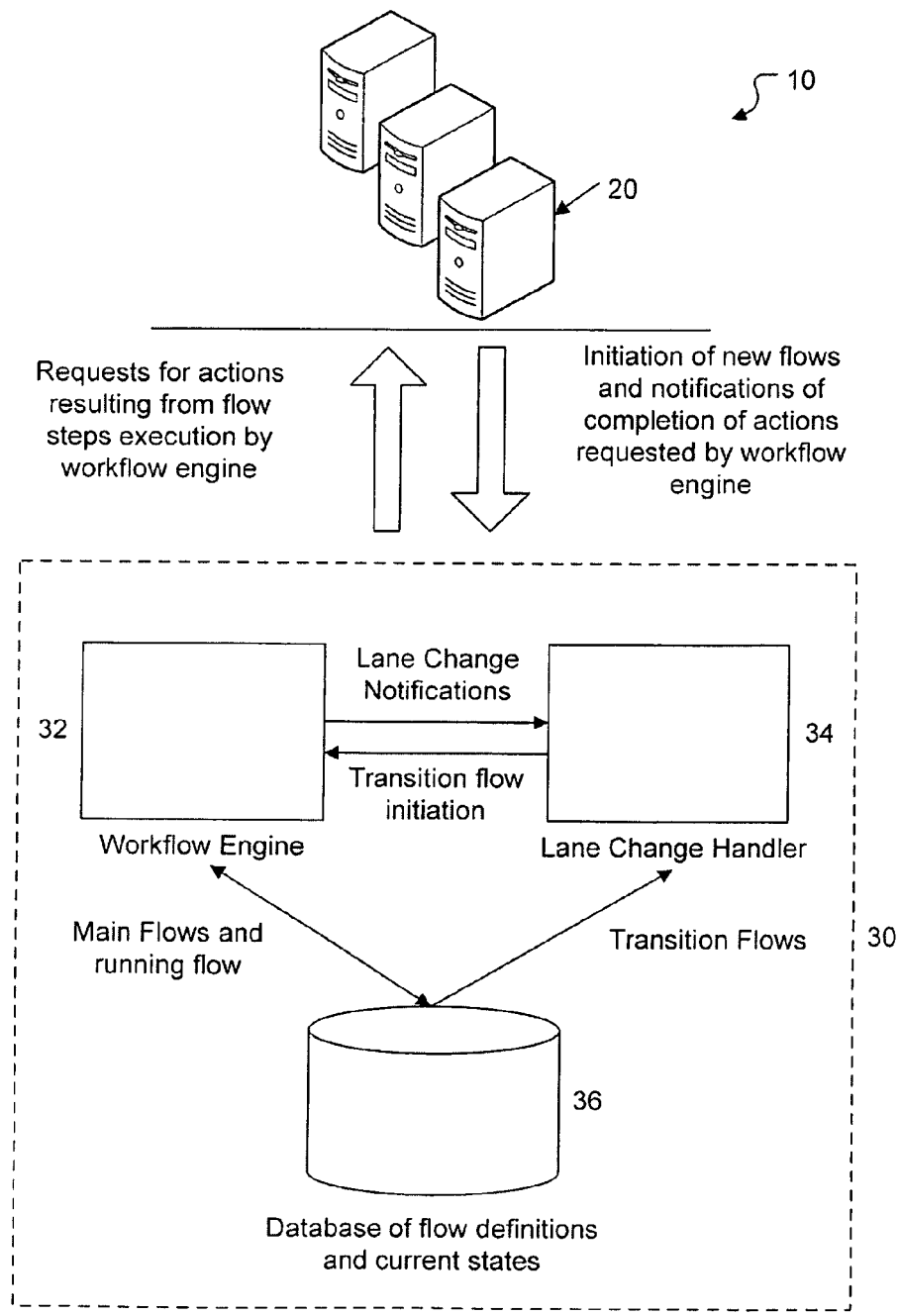
FIG. 1 is a schematic illustration of a system configured to execute a workflow according to an embodiment.

FIG. 1 illustrates a workflow execution system 10 according to an embodiment. System 10 includes one or more computers 20 and a computer 30. Computers 20 may be any computing device, such as one or more servers, configurable to initiate new workflows and act upon requests received from computer 30 upon execution of a workflow. A workflow may be a series of steps in a process where the steps in the process are to be executed by computer 20. These processes may include external processes such as, for example, business transactions, interactions between people, IT operations, usage instructions, etc. Alternatively, the process may be an internal computer process pertaining to computer 30 itself that executes the process of the workflow.

In an embodiment, each computer 20 may also receive requests for actions from computer 30. These requests for actions may be based on the execution of one or more steps in the workflow by computer 30. After completion of these requested actions, each server 20 may then notify computer 30 of the completion of the requested action. Computer 30 may then proceed further in executing the workflow or may terminate the workflow depending on the specific steps in the workflow.

In an embodiment, the workflow being executed by computer 30 may include one or more Swim Lanes. A Swim Lane may be used to group a number of elements in the workflow. For example, in an embodiment where the workflow represents a process internal to computer 30 itself, one Swim Lane may represent all the steps computer 30 may take if computer 30 is in a normal state. Another Swim Lane may represent all the steps taken by computer 30 if computer 30 is in a degraded state. Furthermore, a transition from one Swim Lane to another may occur based on an evaluation made by computer 30 at a decision point within a Swim Lane. In addition, or alternatively, a transition from one Swim Lane to another may occur for any other reason, such as, for example, a shift in the workflow from one organization within a company to another organization within the company, a need for user input to a computer process, or any other reason.

Computer 30 may include a number of components to execute workflows. As shown in FIG. 1, these components may include a work flow engine 32, a lane change handler 34, and a database 36. Workflow engine 32 may execute the steps of a workflow in conjunction with lane change handler 34 and database 36. To this end, workflow engine 32 may execute the steps in each Swim Lane of the workflow. In addition, lane change handler 34 may provide workflow engine 32 with all information pertaining to a transition workflow when workflow engine 32 determines that a transition needs to occur from one Swim Lane to another.

The execution of the workflow including the transition from one Swim Lane to another and an execution of the transition workflow may occur based on flow definitions and state information stored in database 36. To this end, database 36 may store information regarding all the workflows to be executed by workflow engine 32. In addition, database 36 may also store information about the state of the system associated with the workflow. For example, based on the state of the system at a particular step, information of which is provided by database 36, workflow engine 32 may determine what next step to execute in the workflow. In addition, lane change handler 34 may also retrieve transition flow information stored in database 36 and provide this information to workflow engine 32. In an embodiment, database 36 may be an Oracle database, SQL (Sequential Query Language), DB2 (Database 2), or any other database software running on computer 32 that stores and provides information to workflow engine 32 and lane change handler 34.

In an embodiment, the entire workflow may be executed by workflow engine 32. Workflow engine 32 may be a software process that executes on computer 30. Computer 30 may be a single computer or a number of computers connected to each other and configured to execute a workflow. In addition, computer 30 may be one or more generic computers including a CPU (Central Processing Unit), a RAM (Random Access Memory), a ROM (Read Only Memory) I/O devices, and generic application software configured to execute a workflow. On the other hand, computer 30 may include specialized hardware and software configured to execute a workflow. Workflow engine 32 may interpret the semantics of the workflow and execute the steps of the workflow. To this end, workflow engine 32 may manage the loading, initiation, and progression of a workflow at run-time. In addition, workflow engine 32 may also determine when a Swim Lane needs to be changed. Upon determining that a Swim Lane needs to be changed, workflow engine 32 may invoke lane change handler 34.

Lane change handler 34 may determine the flow that is required for processing the Swim Lane transition and may subsequently initiate that workflow. In an embodiment, lane change handler 34 may be a software process that executes on computer 30. Workflow engine 32 and lane change handler 34 may be loaded on the same computer 30 or the same set of computers 30. On the other hand, in an alternative embodiment, workflow engine 32 and lane change handler 34 may be loaded on different computers or a different set of computers.

When the main workflow is in the initiation state, workflow engine 32 may determine the starting point of the workflow and complete the starting point. In addition, workflow engine 32 may complete the required house keeping for the flow. As workflow engine 32 processes each step, the results of the processed step may be stored for further processing. As such, workflow engine 32 may periodically check to see if the step that was initiated has completed and the results of the step has been stored. If so, workflow engine 32 may retrieve the results of the step. Workflow engine 32 may then evaluate all outgoing links to determine the qualifying target steps by comparing the results of a source step against predefined link definitions. In an embodiment, a source step is a step at which workflow engine 32 is at the point of execution. A target step is a step in a workflow that workflow engine 32 will arrive at after the source. A source step and a target step may be in the same Swim Lane or in different Swim Lanes. If a source and a target step are in different Swim Lanes, then execution of the workflow at that point leads to a transition from the Swim Lane including the source step to the Swim Lane including the target step.

For each eligible step whose results match the value of the link, workflow engine 32 may mark the current workflow for a lane change if need be. Workflow engine 32 may also determine the Swim Lanes of the source step and the target step. After determining the Swim Lanes, the workflow engine may invoke lane change handler 34 with the Swim Lane information of the source steps and target steps. Lane change handler 34 may be invoked only if a transition from one Swim Lane to another is required. Also, in an embodiment, the invocation of lane change handler 34 may be automatic.

When invoked with a source step from one Swim Lane and a target step of another Swim Lane, lane change handler 34 may determine the appropriate transition workflow that needs to be initiated to satisfy the Swim Lane transition. Specifically, lane change handler 34 may use one of the constructs discussed below with respect to FIGS. 3A-3D to determine the transition workflow. After determining the transition workflow that matches with the source and target steps, lane change handler 34 may then submit the matched workflow to workflow engine 32 for initiation. Lane change handler 34 may also mark the main workflow for progression once the transition workflow is completed.

After the lane change is complete, workflow engine 32 invokes the target step. This process repeats itself until workflow engine 32 comes across an eligible step as an end point. At this stage, workflow engine 32 completes the workflow.

Figure 2:
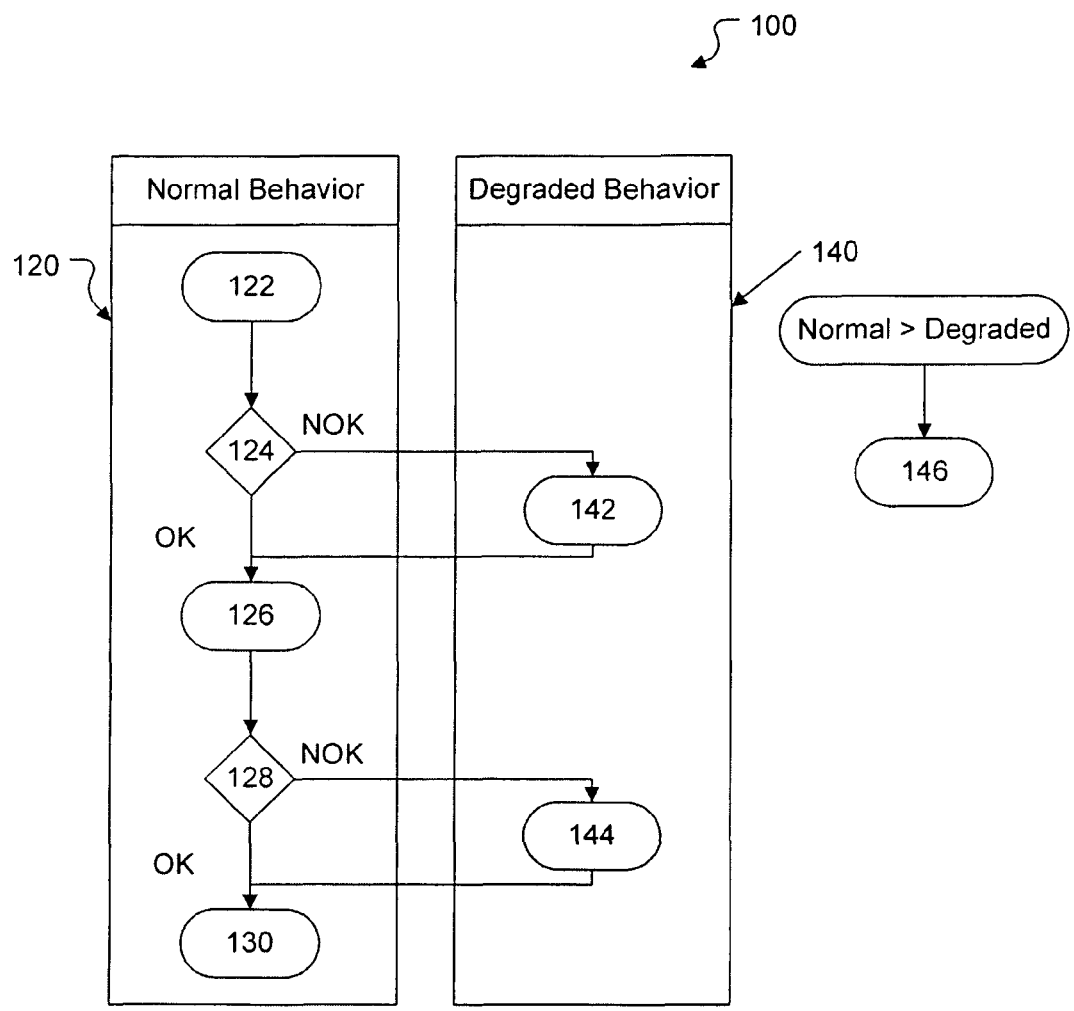
FIG. 2 is a flow representation illustrating the use of Swim Lanes according to an embodiment.

FIG. 2 is a flow representation of workflow 100 for computer 30 of FIG. 1 that illustrates the use of Swim Lanes according to an embodiment. Flow representation of workflow 100 may be used to model any process and depicts the steps to be taken by computer 30 to execute the computer process. As discussed above, these processes may include external processes such as, for example, business transactions, interactions between people, IT operations, usage instructions, etc. Alternatively, as also discussed above, the process depicted by workflow 100 may be an internal computer process pertaining to computer 30 itself that executes the process of workflow 100.

As depicted in FIG. 2, the flow representation of workflow 100 may include Swim Lanes 120 and 140. Furthermore, Swim Lane 120 may include steps 122, 124, 126, 128, and 130. In addition, Swim Lane 140 may include steps 142, 144, and 146. In an embodiment, workflow 100 which is represented by Swim Lanes 120 and 140 in FIG. 2 may be an internal computer process of computer 30 that will execute workflow 100. Any transition from Swim Lane 120 to Swim Lane 140, as shown in FIG. 2, may be a transition from normal behavior of computer 30 within workflow 100 to degraded behavior of computer 30 within the same workflow 100, based on the evaluation made by computer 30 at decision point 124.

In another embodiment, in a process that depicts a procedure of computer 30 to achieve a particular goal, Swim Lane 120 could represent all the steps performed by computer 30 that lead to the desired outcome, and Swim Lane 140 could represent unexpected or undesired steps (e.g., errors) performed by computer 30. In yet another embodiment, where process flows within an organization are controlled by computer 30, Swim Lane 120 may group all steps taken by Sales and Accounting in that organization through computer 30, while Swim Lane 140 may depict steps taken through computer 30 by another group, such as, for example, Engineering, in that organization. In addition, any other such grouping of steps in a workflow by computer 30 and transitioning between groups may be contemplated without departing from the scope of this disclosure. Furthermore, one skilled in the art will also appreciate that workflow 100 may also represent a process external to computer 30.

While in an embodiment, steps 122, 124, 126, 128, 130, 142, 144, and 146 are grouped in Swim Lanes 120 and 140, in other embodiments, zones, phases, or other such terms may be used to identify the grouping of these steps in a flow representation of the processes of computer 30. Furthermore, while two Swim Lanes 120 and 140 are disclosed in FIG. 2, any number of Swim Lanes may be used as part of a workflow representation without departing from the scope of this disclosure.

Steps 122, 124, 126, 128, 130, 142, 144, and 146 may include logical and temporal connections between them. Furthermore, in many instances, workflow 100 may include a number of repetitive steps. For example, step 146, that is part of Swim Lane 140, may be repeated a number of times whenever a transition occurs from Swim Lane 120 (Normal behavior) to Swim Lane 140 (Degraded behavior). Rather than represent step 146 in Swim Lane 140 explicitly each time a transition is made to Swim Lane 140, it may be beneficial to represent step 146 just once in a workflow as shown in FIG. 2.

The use of Swim Lanes 120 and 140 is contemplated as a method to isolate, represent and manage repetitive steps such as, for example, step 146, implicitly, but execute these repetitive steps explicitly by defining standard rules of transition in workflow 100. Additionally, Swim Lanes 120 and 140 may be used to handle previously undefined behavior from workflow flow 100 of computer 30. That is, rather than explicitly defining and managing each and every change from one step to another or from one Swim Lane to another, this disclosure contemplates the use of methods and apparatus to define constructs that would cover such changes and the use of these constructs to simplify the management and execution of processes of computer 30 in workflow 100. For example, referring to FIG. 2, rather than representing each and every step in workflow 100 which may result in duplication of steps or whole sequences, defining a transition as "whenever we switch from normal to degraded state, perform step 146" may simplify the modeling and representation of workflow 100 of computer 30.

In several embodiments, Swim Lane Transitions may be represented by four new constructs defined below. Each construct may be modeled by creating specialized starting points for other workflow fragments. That is, each construct may begin with a specific starting point, the occurrence of which will cause certain steps that follow from the specific starting point to be executed by computer 30.

FIGS. 3A-3D are flow representations of constructs illustrating Swim Lane Transitions according to an embodiment. Furthermore, each construct definition assumes there is a transition "from" one lane "to" another. The "from" lane may be known as the source lane and the "to" lane may be known as the target lane. For example, in a flow representation of workflow 100 of computer 30 as shown in FIG. 2, if a transition occurs from Swim Lane 120 to Swim Lane 140, Swim Lane 120 may be known as the source lane and Swim Lane 140 may be known as the target lane. Then, if a transition occurs again from Swim Lane 140 to Swim Lane 120, the roles are reversed. That is, Swim Lane 120 is then the source lane and Swim Lane 140 is the target lane. Any number of transitions may take place between Swim Lanes depending on the type of workflow being processed by computer 30.

Figure 3A:
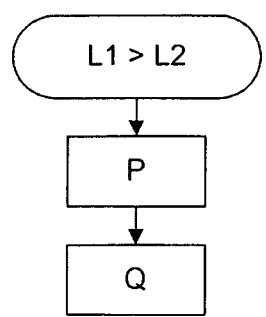
FIGS. 3A-3D are flow representations of constructs illustrating Swim Lane Transitions according to an embodiment.

Construct 1: When transitioning from lane L1 to lane L2. Referring to FIG. 3A, in this example, P and Q may be user defined steps that are executed by computer 30 whenever the main workflow transitions from lane L1 to lane L2. In this case, the transition from lane L1 to lane L2 is a specific starting point, after whose occurrence computer 30 executes steps P and Q.

Figure 3B:
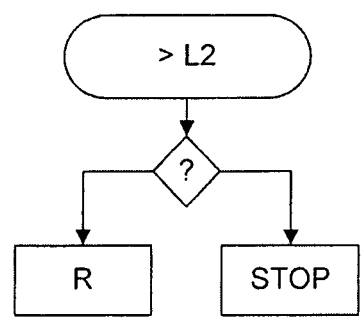

Construct 2: When transitioning from any lane to lane L2 (or on entering lane L2). Referring to FIG. 3B, in this example, R and STOP may be user defined steps that need to be executed by computer 30 based on the decision box whenever the main workflow first enters lane L2. The execution of the main flow by computer 30 may not resume if STOP is encountered. In this case, the transition from any lane to lane L2 is another specific starting point, after whose occurrence computer 30 executes steps R or STOP based on decision box?.

Figure 3C:
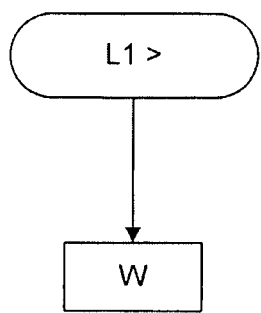

Construct 3: When transitioning from lane L1 to any lane (or on leaving Lane L1). Referring to FIG. 3C, in this example, W may be a user defined step that may be executed by computer 30 whenever the main workflow first leaves lane L1. In this case, the transition from lane L1 to any other lane is another specific starting point, after whose occurrence computer 30 executes step W.

Figure 3D:
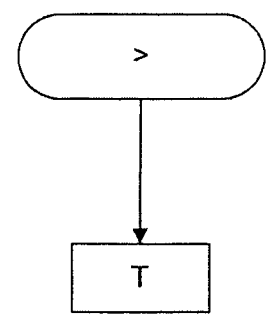

Construct 4: When transitioning from any lane to any lane (or switching a lane). Referring to FIG. 3D, in this example, T may be a user defined step that may be executed by computer 30 whenever the main workflow of computer 30 first switches a lane. In this case, the specific starting point is a transition from any lane to any other lane, after whose occurrence computer 30 executes step T.

In an embodiment, certain interpretation criteria may be used to effectuate transitions from one Swim Lane to another. For example, whenever computer 30 completes a step in the main flowchart, computer 30 can evaluate all eligible connectors that flow from the step. Then, for every lane switch that would result from the relevant connectors, eligible lane transitions may be triggered by matching the source lane and the target lane. If more than one lane switch is eligible, the lane with the highest priority may be selected. Once the lane switch rules have completed execution, computer 30 may resume the main process, provided no lane switch rule stopped the process altogether.

Referring back to FIG. 2, in an embodiment, workflow 100, Swim Lanes 120 and 140, steps 122, 124, 126, 128, 30, 142, 144, and 146, and the links connecting the steps may be represented in mathematical terms to implement a transition from one Swim Lane to another. For example, workflow 100 may be represented as a directed graph or digraph G where G is an ordered pair G:=(V,A), V being a set whose elements are the steps 122, 124, 126, 128, 130, 142, 144, and 146. Furthermore, A is a set of ordered pairs of vertices known as the links interconnecting steps 122, 124, 126, 128, 130, 142, 144, and 146. As mentioned above, step 146 may be a step that is performed repeatedly every time the steps in Swim Lane 140 are executed by computer 30. Nevertheless, even though step 146 is implicitly represented as shown in FIG. 2, step 146 may still be part of digraph G. Furthermore, each of steps 122, 124, 126, 128, 130, 142, 144, and 146, is a single computing unit of work that is completed on computer 30 and is recoverable.

The behavior of each step is dictated by input parameters to computer 30 at each step and at completion will produce results (or an outcome). Each step can produce multiple links based on the evaluation of the results. Furthermore, in some cases, not all links may be defined.

A link may be defined as e:=(x,y). Link e may be considered to be directed from step x to step y, step x being a source step and step y being a target step. Each Swim Lane 120 and 140 may be a disjoint subset of V within the directed graph G, such that the union of swim lanes 120 and 140 constitutes V. The act of switching from one Swim Lane to another, when two linked steps belong to two different Swim Lanes may be defined as a transition. Thus, in FIG. 2, the act of moving from Swim Lane 120 to Swim Lane 140, where decision step 124 and step 142 belong to different Swim Lanes 120 and 140 respectively, would be considered a transition.

During a workflow, a first transition usually occurs from a main workflow of computer 30 to a transition workflow of computer 30. In mathematical terms, a main workflow may be a directed graph G such that $L \subset G$, where L is a Swim Lane. That is, if a main workflow G has only one Swim Lane L, then L=G. If however main workflow G as more than one Swim Lane L, then each Swim Lane L is included in main workflow G. On the other hand, a transition workflow may be a directed graph $T_g$ that is initiated when a link e in the main workflow G is directed from step x to step y, where step x and step y belong to different Swim Lanes. In mathematical terms, $x \in G$ and $y \in G$; $e:=(x,y)$; and $x \in L_n$ and $y \notin L_n$. In addition, directed graph $T_g$ may be processed as if it were in a single Swim Lane.

Workflow 100 of computer 30 includes a starting point 122 and an end point 130. Starting point 122 does not have any incoming links. While workflow 100 as shown in FIG. 2 discloses only one starting point, in an alternative embodiment, a multi-threaded workflow for computer 30 may have multiple starting points. While workflow 100 in FIG. 2 illustrates starting point 122 and end point 130 as being in the same Swim Lane 120, in alternative embodiments, starting point 122 and end point 130 may be in different Swim Lanes.

While the present disclosure has been described in connection with the illustrated embodiments, it will be appreciated and understood that modifications may be made without departing from the spirit and scope of the disclosure.

What is claimed is:

1. A method of executing a workflow in a computer; comprising:

representing a main workflow of at least one computer as a series of steps which are linked to define the workflow, the steps of the main workflow being grouped in at least two swim lanes, the workflow repeatedly transitioning between ones of the at least two Swim lanes;

representing a transition workflow as at least one predetermined transition step, the at least one predetermined transition step not being linked to the steps of the main workflow within the representation of the main workflow, the at least one predetermined transition step not being grouped within any of the at least two swim lanes;

defining a rule for executing the transition workflow for each and every transition between the different swim lanes for storage in a database;

executing in at least one computer using a workflow engine, the steps of the main workflow in an order defined by the links between the steps of the main workflow;

evaluating the rule, by a lane change handler in communication with the database, to determine whether the rule applies each and every time during the executing that a step from one of the swim lanes is followed by a step from another of the swim lanes; and executing the steps of the same transition workflow each and every time the rule applies by the lane change handler, wherein the steps of the transition workflow are performed between the step of the one of the swim lanes and the step of the another of the swim lanes.

2. The method of claim 1, wherein the transition workflow is executed in response to an undesired determination in the main workflow.

3. The method of claim 1, wherein the rule is defined as a transition from a step in one specific swim lane to a step in another specific swim lane.

4. The method of claim 1, wherein the rule is defined as any transition into a step of a specific swim lane.

5. The method of claim 1, wherein the rule is defined as any transition out of a step of a specific swim lane.

6. The method of claim 1, wherein the rule is defined as any transition from a step of any swim lane to a step of any other swim lane.

7. The method of claim 1, wherein at least one of the at least two groups contains normal steps when the at least one computer is determined to be operating normally and at least one of the at least two groups contains unexpected steps when the at least one computer is determined to be operating in an unexpected manner.

8. An apparatus for executing a workflow, comprising:
a processor comprising:
a workflow engine configured and arranged to execute a main workflow, the main workflow being represented as a series of steps, the steps of the main workflow being grouped in at least two swim lanes, the steps being linked to define the workflow, the workflow repeatedly transitioning between ones of the at least two swim lanes, the workflow engine also determining each and every time a step from one of the swim lanes is followed by a step from another of the swim lanes and reporting a transition in response, the workflow engine also executing a transition workflow in response to a transition workflow command corresponding to the reported transition, the transition workflow being represented by at least one predetermined step not linked to the steps of the main workflow within the representation of the main workflow, the at least one predetermined transition step not being grouped within any of the at least two swim lanes;
a database storing transition flow information comprising a plurality of rules for executing one of a plurality of transition workflows;
a lane change handler constructed and arranged to receive the reported transition from the workflow engine and using the transition flow information from the database to determine whether a rule applies to each and every reported transition, the rule being based on a specific transition between steps of different swim lanes, the lane change handler further constructed and arranged to generate the transition workflow command to cause the workflow engine to execute the same transition workflow each and every time the rule applies to the reported transition, wherein the transition workflow is executed between a step of the one of the swim lanes and a step of the another of the swim lanes.

9. The apparatus of claim 8, wherein the workflow engine executes the transition workflow in response to an undesired determination in the main workflow.

10. The apparatus of claim 8, wherein the rule is defined as a transition from a step in one specific swim lane to a step in another specific swim lane.

11. The apparatus of claim 8, wherein the rule is defined as any transition into a step of a specific swim lane.

12. The apparatus of claim 8, wherein the rule is defined as any transition out of a step of a specific swim lane.

13. The apparatus of claim 8, wherein the rule is defined as any transition from a step of any swim lane to a step of any other swim lane.

14. The apparatus of claim 8, wherein the workflow engine comprises a computer.

15. The apparatus of claim 8, wherein the lane change handler comprises a computer.

16. The apparatus of claim 8, wherein at least one of the at least two groups contains normal steps when the processor is determined to be operating normally and at least one of the at least two groups contains unexpected steps when the processor is determined to be operating in an unexpected manner.

17. A method for executing a workflow, comprising:
receiving at least two reported transitions from at least one computer comprising a workflow engine executing steps of a main workflow;
determining, using information from a database storing transition flow information, whether one of a plurality of predetermined rules applies to each and every reported transition, the predetermined rule being based on transitions between steps of the main workflow grouped within different swim lanes of the main workflow;
generating, using a lane change handler, a transition workflow command to enable a predetermined change in direction from one of the steps of one of the different swim lanes to another one of the steps of another one of the different swim lanes each and every time the predetermined rule applies, wherein the transition workflow command is not one or more steps of the main workflow, wherein the transition workflow is associated with the predetermined rule and not grouped within any of the different swimlanes, and wherein the transition workflow command is the same each and every time the predetermined rule applies; and
transmitting the transition workflow command to the workflow engine.

18. The method of claim 17, wherein the transition workflow command is generated in response to an undesired determination in the main workflow.

19. The method of claim 17, wherein the predetermined rule is defined as a transition from a step in one specific swim lane to a step in another specific swim lane.

20. The method of claim 17, wherein the predetermined rule is defined as any transition into a step of a specific swim lane.

21. The method of claim 17, wherein the predetermined rule is defined as any transition out of a step of a specific swim lane.

22. The method of claim 17, wherein the predetermined rule is defined as any transition from a step of any swim lane to a step of any other swim lane.

23. The method of claim 17, wherein:
the steps are grouped into at least two groups; and
at least one of the at least two groups contains normal steps when the at least one computer is determined to be operating normally and at least one of the at least two groups contains unexpected steps when the at least one computer is determined to be operating in an unexpected manner.

24. A method for executing a workflow; comprising:
executing a main workflow using a workflow engine in at least one computer, the main workflow being represented as a series of steps which are arranged in at least two swim lanes, the workflow repeatedly transitioning between ones of the at least two swim lanes;

defining the workflow based on links of each of the steps, the defining including defining one of a plurality of rules for executing an associated transition workflow for each and every transition between the different swim lanes, the rules and transition workflow information stored in a database;

determining each and every time a step from one of the swim lanes is followed by a step from another of the swim lanes;

reporting a transition in response to the determining; and executing, by a lane change handler, in the at least one computer a transition workflow in response to a transition workflow command corresponding to the reported transition, the transition workflow being represented by at least one predetermined step not linked to the steps of the main workflow, the at least one predetermined step is associated with the rule and not being grouped within any of the at least two swim lanes, wherein the transition workflow is executed between the step of the one of the swim lanes and the step of the another of the swim lanes each and every time the rule applies and wherein the transition workflow is not one or more steps of the main workflow.

25. The method of claim 24, wherein the transition workflow command is received in response to an undesired determination in the main workflow.

26. The method of claim 24, wherein the transition workflow is executed in response to an undesired determination in the main workflow.

27. The method of claim 24, wherein at least one of the at least two groups contains normal steps when the at least one computer is determined to be operating normally and at least one of the at least two groups contains unexpected steps when the at least one computer is determined to be operating in an unexpected manner.

* * * * *